US006258216B1

(12) United States Patent
Ohkawa

(10) Patent No.: US 6,258,216 B1
(45) Date of Patent: Jul. 10, 2001

(54) CHARGED PARTICLE SEPARATOR WITH DRIFT COMPENSATION

(75) Inventor: Tihiro Ohkawa, La Jolla, CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 0 days.

(21) Appl. No.: 09/335,235

(22) Filed: Jun. 17, 1999

Related U.S. Application Data

(63) Continuation-in-part of application No. 08/970,548, filed on Nov. 14, 1997, now Pat. No. 5,939,029.

(51) Int. Cl.[7] .................................................. B01J 19/08

(52) U.S. Cl. .......................................... 204/156; 422/186

(58) Field of Search .............................. 422/186; 204/156

(56) References Cited

U.S. PATENT DOCUMENTS

| | | |
|---|---|---|
| 3,780,309 | 12/1973 | Bochard . |
| 3,845,315 | 10/1974 | Blum . |
| 3,962,587 | 6/1976 | Dufrane et al. . |
| 4,637,545 | 1/1987 | Stewart . |
| 4,987,007 | 1/1991 | Wagal et al. . |
| 5,225,740 | 7/1993 | Ohkawa . |
| 5,350,454 | 9/1994 | Ohkawa . |
| 5,478,608 | 12/1995 | Gorokhovsky . |
| 5,681,434 | 10/1997 | Eastlund . |

FOREIGN PATENT DOCUMENTS

| | | |
|---|---|---|
| WO 97/34685 | 9/1997 | (WO) . |

*Primary Examiner*—Kishor Mayekar
(74) *Attorney, Agent, or Firm*—Nydegger & Associates

(57) ABSTRACT

An ion separator includes a plasma source for generating a multi-species plasma having ions of heavy mass ($M_2$) and light mass ($M_1$). Also included is an accelerator for accelerating these ions to a common velocity ($v_o$) before they are injected into a hollow chamber. For this invention, the chamber can be configured as a toroid or a cylinder confining a curved path which generates a mass proportional drift velocity ($u_d$) for each ion as it travels along the path. Consequently, ions will collide with the chamber wall, in sequence, according to their mass. This will be at predetermined arc lengths (L) along the path in the chamber. Specifically, ions of heavy mass ($M_2$) will collide with the chamber wall before ions of light mass ($M_1$). The ions can then be subsequently removed from the chamber wall. For one embodiment, the geometry of the chamber is established as a helix having a pitch angle which captures only heavy mass ions ($M_2$) and allows ions of light mass ($M_1$) to completely transit through the chamber.

21 Claims, 3 Drawing Sheets

CHARGED PARTICLE SEPARATOR WITH DRIFT COMPENSATION

This application is a continuation-in-part of application Ser. No. 08/970,548, filed Nov. 14, 1997, now U.S. Pat. No. 5,939,029. The contents of application Ser. No. 08/970,548 are incorporated herein by reference.

FIELD OF THE INVENTION

The present invention pertains generally to methods and devices for separating a mixture or a composition of matter into its constituent elements. More specifically, the present invention pertains to methods and devices for separating a mixture or composition of matter into separate constituents according to the mass of the constituent element. The present invention is particularly, but not exclusively, useful for separating and segregating the heavier mass ions of a multi-species plasma from the lighter mass ions of the plasma, according to the mass of the ions.

BACKGROUND OF THE INVENTION

Many applications can be cited wherein it is desirable to separate and segregate the different constituent elements of a mixture from each other. In some instances this separation can be accomplished mechanically, and in others it can be accomplished chemically. There are, however, instances when neither conventional mechanical nor chemical means are appropriate or effective for this purpose. For example, nuclear waste remediation is an endeavor wherein it can be extremely difficult and dangerous to employ conventional methods for the purpose of separating the radionuclides in a waste material from its benign constituents. Other examples could also be cited.

In view of the difficulties that are encountered when using more conventional methods to isolate radionuclides from other material, efforts have recently been made to develop alternative methods and systems for the handling of such materials. One alternative has been to create a multi-species plasma from mixtures of material, such as nuclear waste, and to then separate the heavier mass ions of the radionuclides from the lighter mass ions of the benign constituents. An example of such a procedure is provided in U.S. application Ser. No. 970,548 which was filed by Ohkawa on Nov. 14, 1997, now U.S. Pat. No. 5,939,029, for an invention entitled "Nuclear Waste Separator" and which is assigned to the same assignee as the present invention.

It is known that in order to effectively separate ions of different mass from each other, it is necessary to somehow exploit a physical phenomenon to which the ions are susceptible and to which they will react differently. Plasma centrifuges are exemplary of devices which are capable of such exploitation. Specifically, in a plasma centrifuge, a plasma is swirled through the centrifuge chamber along helical paths. While traveling on these paths, the ions are subjected to centrifugal forces which tend to drive them away from their axis of rotation. More specifically, because the centrifugal forces are proportional to the mass of the individual ions on which they act, heavier ions experience greater centrifugal forces than do lighter ions. By exploiting this difference, the ions can be separated and subsequently collected according to their mass.

Using a variation on the physics of a plasma centrifuge, a plasma filter has also been disclosed which can be used to separate ions according to their mass. In the chamber of the plasma filter, this separation is accomplished by effectively confining ions which have a mass that is less than some preselected value, and collecting them at the exits of the chamber. Specifically, this confinement is to a defined volume inside the plasma filter chamber. The heavier mass ions, however, experience no such constraint in the chamber of the plasma filter. Instead, the heavier ions are forced to exit radially from the defined volume and can be collected either directly from the wall of the plasma filter chamber, or from specially designed collectors located on the wall of the chamber. A disclosure of such a device is provided in U.S. application Ser. No. 192,945 which was filed by Ohkawa on Nov. 16, 1998, now U.S. Pat. No. 6,096,220, for an invention entitled "Plasma Mass Filter" and which is assigned to the same assignee as the present invention. For the operation of either a plasma centrifuge or a plasma filter, however, it is necessary to inject a rotating plasma into the centrifuge chamber, and to maintain the rotation with an electric field that is applied perpendicular to the magnetic field.

In addition to centrifugal forces, it is also known that mass proportional forces can be generated on ions as they transit a curved path which will cause the ions to drift in a direction that is perpendicular to the action of the centrifugal forces and, thus, perpendicular to the plane of the ion's path. Specifically, it can be shown mathematically that the drift velocity, $u_d$, of an ion having a mass, M, which is under the influence of a magnetic field, $B_\Theta$, as it travels at a velocity $v_o$ along a curved path having a radius of curvature, R, can be expressed as:

$$u_d = Mv_o^2/eRB_\Theta$$

Since the electron thermal energy is comparable to the ion directed energy, the electrons will have a comparable, but opposite, drift velocity due to the perpendicular electron velocity. These opposite drifts can lead to charge separation and a vertical electric field, and the resulting E×B drifts can carry both electrons and ions radially outward. To avoid this plasma expulsion, a path must be provided to allow the more mobile electrons to neutralize the ions and avoid a charge build-up. The electrons can be collected at the wall, or along the field lines if the end plates are conducting and the path length is not too long. Alternatively, transparent conducting grids across the plasma can be used. This process results in a vertical current ($j_z$) carried by the ions with no electric field. It is this current crossed with the magnetic field ($j_z$XB) which balances the centrifugal force.

In order to isolate the effect of the drift velocities ($u_d$) on the ions as they travel the curved path, it is necessary to establish $B_\Theta$ such that the centrifugal forces on the ions are canceled. Thus, the ions will move along the curved path, and tend to drift in a direction that is perpendicular to the path's radius of curvature (R) at a drift velocity ($u_d$). Where more than one type of ion is present in the plasma (with the heavier ions having a mass of $M_2$ and a drift velocity $u_{d2}$, and with the lighter ions having a mass of $M_1$ and a drift velocity $u_{d1}$), it can also be mathematically shown that the time, τ, for the $M_1$ ions to drift through a distance, $h_1$, for the $M_2$ ions to drift through a distance, $h_2$, and for the ions to thereby separate from each other through a distance Δh will be:

$$\tau = \Delta h/(u_{d2} - u_{d1})$$

Next, using the geometrical relationship between the arc distance(L) and the radius of curvature (R), namely; L=RΘ, the arc angle,Θ, traveled by an ion along the magnetic field while drifting through a distance, Δh, can then be expressed as:

$$\Theta = eB_\Theta \Delta h/(M_2 - M_1)v_o$$

The point here is that, in accordance with the above expressions, a curved path of travel for ions in a multi-species plasma can be constructed which will generate vertical drift velocities for the ions. Further, because the drift velocity of an ion will be proportional to the mass of the particular ion, all ions in a multi-species plasma can be predictably separated from each other. Further, this separation will be according to their respective masses, after they have traveled a distance L along the path.

In light of the above it is an object of the present invention to provide an ion separator which can effectively separate ions of a multi-species plasma according to their respective masses. Another object of the present invention is to provide an ion separator which can effectively separate ions of a multi-species plasma without the need for active electrodes to support the plasma rotation. Yet another object of the present invention is to provide an ion separator which does not require a rotation of the multi-species plasma to be driven across the magnetic field before ions in the plasma can be separated from each other. Another object of the present invention is to provide an ion separator which can be geometrically and dimensionally configured to provide an effective separation of ions in a multi-species plasma according to their mass. Still another object of the present invention is to provide an ion separator and a method for its use which is simple and cost effective.

SUMMARY OF THE PREFERRED EMBODIMENTS

In accordance with the present invention an ion separator uses a plasma source to generate a multi-species plasma from a mixture of elements, such as a mixture of nuclear waste and non-hazardous materials. Consequently, the multi-species plasma will include a plurality of ions that are typical of nuclear waste and which have a relatively heavy mass ($M_2$). The multi-species plasma, however, will also have a plurality of ions that are typical of non-hazardous materials and which have a relatively light mass ($M_1$). The ion separator of the present invention also includes an accelerator which is connected in fluid communication with the plasma source to accelerate ions of the multi-species plasma to a common velocity ($v_o$). The ions are then injected into a curved chamber at the common velocity $v_o$.

The chamber that is used for the ion separator of the present invention is hollow, and it is curved. More specifically, the chamber is configured with an enclosing wall which is bent with a radius of curvature, R. Thus, the chamber establishes a curved path along which it is intended that ions will transit the chamber. Further, the chamber has a first end where ions of the multi-species plasma are injected into the chamber (at the common velocity ($v_o$)). The chamber also defines a central axis which is substantially coincident with, and extends substantially along, the curved path in the chamber.

In the construction of the chamber, there is at least a distance (h) between the central axis of the chamber and the wall of the chamber. As more fully set forth below, this distance (h) can be determined and varied according to the drift velocities ($u_d$) that are experienced by the individual ions. Additionally, a magnetic field is created by a means, such as an electromagnetic coil, placed around the outside of the chamber wall. The resulting magnetic field inside the chamber is oriented substantially in the direction of the chamber's central axis. This magnetic field is selected to have a magnitude, $B_\Theta$. The current resulting from the differential drifts between electrons and ions crossed with this magnetic field will then counterbalance the centrifugal forces which act on the ions as they transit the chamber.

As intended for the present invention, the movement of ions along the curved path inside the chamber will be substantially at the common velocity $v_o$. As indicated above, under the influence of $B_\Theta$ the centrifugal forces will be balanced and ions in the multi-species plasma will therefore travel along a curved path having a substantially constant radius of curvature. Nevertheless, each ion will experience a drift velocity ($u_d$), proportional to its mass, which tends to lift it in a direction that is perpendicular to the curved path's radius of curvature. The actual distance (h) through which an ion will drift as it travels an arc length L through the chamber at a velocity $v_o$ can then be determined by the expression $h=u_dL/v_o$. Accordingly, after traveling an arc distance L, light ions of mass $M_1$ will drift through a distance $h_1$ where $h_1=u_{d1}L/v_o$. At the same time, heavy ions of mass $M_2$ will drift through a distance $h_2$ where $h_2=u_{d2}L/v_o$.

Based on the dimension "h" selected for the chamber, a predetermined arc length (L) can be established along the path through the chamber such that each ion will collide with, or contact, the wall of the chamber. This arc length, L, will be shorter for the heavier ions of mass $M_2$ ($L_2$) than it will be for the ions of lighter mass $M_1$ ($L_1$). In terms of the various variables involved, and wherein e is the elementary charge, the arc angle $\Theta$ corresponding to the arc length L at which ions will collide with the chamber wall can be expressed as: $\Theta=eB_\Theta h/(M_2-M_1)v_o$. Multiply charged ions will behave the same as ions with a lighter mass that is equal to their mass divided by the charge state.

In an alternate embodiment of the present invention, the chamber can be configured generally as a cylinder rather than as a tube. With such a cylindrical configuration, the electromagnetic coil will extend around the outside of the chamber wall, as before. In this case, however, the coil will be continued as a central column along the cylinder's longitudinal axis inside the chamber. The result will be that a magnetic field can be generated inside the cylindrical chamber which will establish a plasma path through the chamber that, in all essentials, is identical to the path established by the chamber configurations disclosed above.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
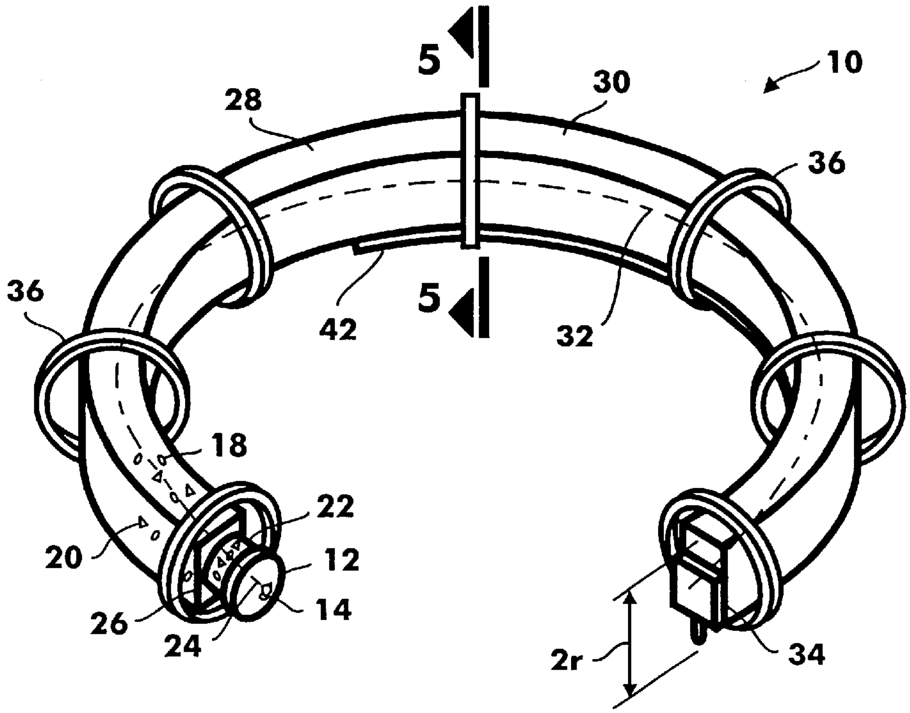
FIG. 1 is a perspective view of an ion separator in accordance with the present invention as seen from the front and from above.

Referring initially to FIG. 1, an ion separator in accordance with the present invention is shown and generally designated 10. More specifically, as shown in FIG. 1, the ion separator 10 includes a plasma generator 12 wherein a material mixture having a combination of elements, such as the nuclear waste 14 and non-hazardous constituents are vaporized into a multi-species plasma 16. Methods for generating the plasma 16 are well known in the pertinent art, and it is also known that the plasma 16 which is generated will include both light ions 18, having a representative mass $M_1$, and heavy ions 20, having a representative mass $M_2$. FIG. 1 also shows that an accelerator 22 is adjacent the plasma generator 12 and is in fluid communication with the plasma generator 12. The specific purpose of the accelerator 22 is to accelerate all of the ions 18,20 in the multi-species plasma 16 along a path 24 to a common velocity $v_o$. Importantly, as the ions 18,20 enter through the end 26 of a hollow chamber 28, all of the ions 18, 20 will be traveling at the common velocity $v_o$.

Figure 2:
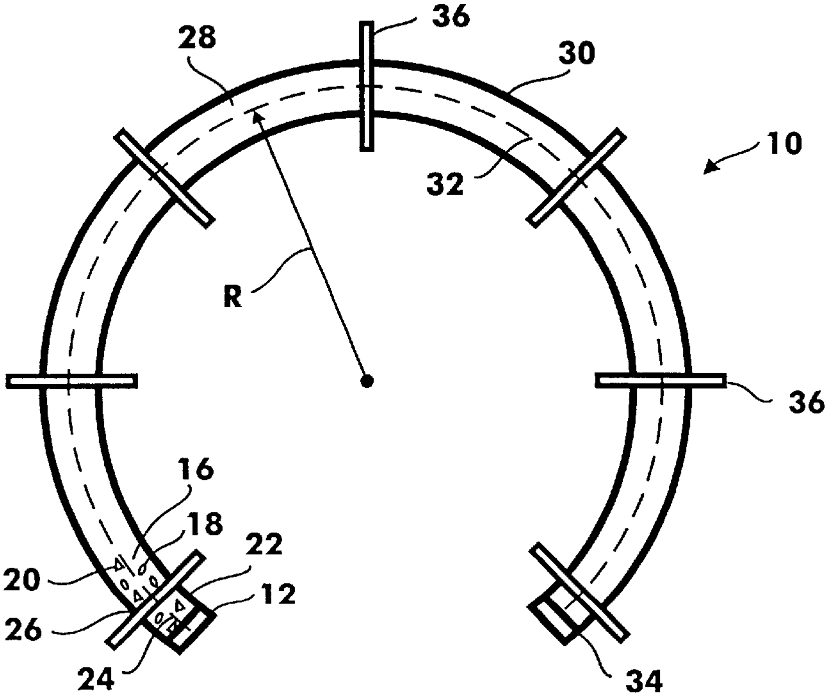
FIG. 2 is a top plan view of the ion separator shown in FIG. 1.

Although the shape of a cross section of the hollow chamber 28 is somewhat a matter of design choice, the chamber 28 will, preferably, be generally configured as a toroid having a substantially rectangular cross section having a height of 2 r. More specifically, the chamber 28 is formed by a wall 30 and it defines a curved central axis 32 which extends from the end 26 to the end 34 of chamber 28. Further, as best seen in FIG. 2, it is important that the central axis 32 have a constant radius of curvature, R, between the ends 26,34.

Figure 3:
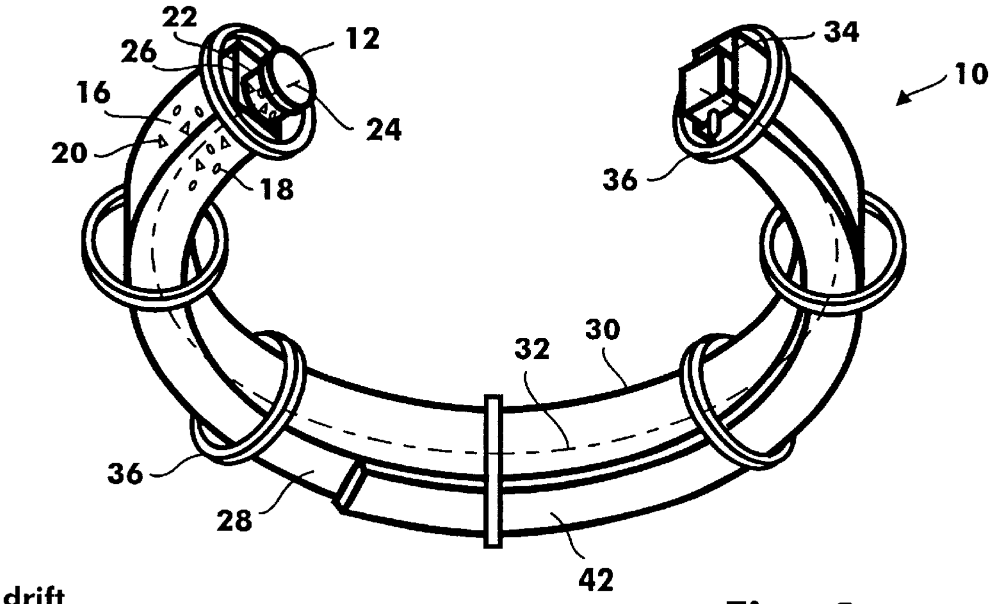
FIG. 3. Is a perspective view of the ion separator shown in FIG. 1 as seen from the front and from below.

Still referring to FIG. 1 it will be seen that the ion separator 10 includes a plurality of electromagnetic coils 36 of a type well known in the pertinent art. While the coils 36 are shown in FIG. 1, FIG. 2 and FIG. 3 to be segmented, it is to be appreciated that segments of the coil 36 will be positioned so that a magnetic field can be generated by the coil 36 throughout the length of the chamber 28 from end 26 to end 32. More specifically, the magnetic field will be generally axially oriented along the central axis 32, and it will have a magnitude, $B_\theta$, which is sufficient to maintain the movement of ions 18,20 in the general direction of the central axis 32. While only electromagnetic coils 36 are shown in FIGS. 1–3, it will be appreciated by the skilled artisan that any magnetic means which is capable of generating an axially oriented magnetic field with a magnitude $B_\theta$can be used with the ion separator 10.

Figure 4:
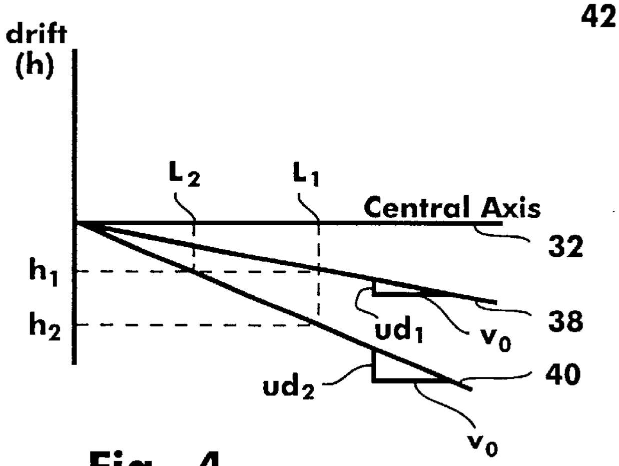
FIG. 4 is a graph showing the functional relationship between the distance (h) an ion will drift as it transits the ion separator and the distance the ion has traveled through the ion separator.

In the operation of an ion separator 10, based on above disclosure, as each of the ions 18,20 transit through the chamber 28 it will have a component of velocity that is common to all of the ions 18,20 and equal in magnitude to the common velocity $v_o$. This common velocity component will be directed substantially along the central axis 32. Depending on the mass ($M_1$ or $M_2$) of the particular ion 18,20 it will also have a drift velocity that is mass proportional. As disclosed above, this mass proportional component of velocity is referred to herein as a drift velocity and will be directed downward and substantially perpendicular to the central axis 32. Specifically, for a light ion 18 of mass $M_1$ the magnitude of this drift component will be; $u_{d1}=M_1v_o^2/eRB_\theta$: and for an ion 20 of mass $M_2$ the magnitude of this drift component will be; $u_{d2}=M_2v_o^2/eRB_\theta$. The result of this, as shown in FIG. 4 is that the light ions 18 will follow a path 38 (shown in profile) as they transit chamber 28. On the other hand, the heavy ions 20 will follow a path 40 (also shown in profile) as they transit the chamber 28. The consequences of this will be best appreciated by cross referencing FIG. 1, 2 and 3 with FIG. 5.

As an example of operational dimensions for the ion separator 10 of the present invention, consider the radius of curvature, R, for the chamber 28 to be equal to eight meter (R=8 m). Next, consider the arc length of the chamber 28 from its end 26 to the end 34 to be equal to at least about 39.4 meters. With these dimensions, and with a magnitude for the magnetic field in the chamber 28 of around 0.03 Tesla ($B_\theta$=3.0 $10^{-2}$ T), it can be shown that all of the heavy mass ions ($M_2$) 20 in the multi-species plasma 16 will have drifted downward through a distance of approximately 1.6 meters during their transit along the 39.4 meter arc length of the chamber 28. On the other hand, and at the same time, it can be shown that all of the light mass ions ($M_1$) 18 in the multi-species plasma 16 will have drifted downward through a distance of only about 0.41 meters during their transit of the 39.4 meter arc length of the chamber 28. Accordingly, in order not to collect light mass ions 18, and instead, contain them inside the chamber 28, the plasma generator 12 should be located above the central axis 32 where the multi-species plasma 16 enters the chamber 28 at the end 26.

Figure 5:
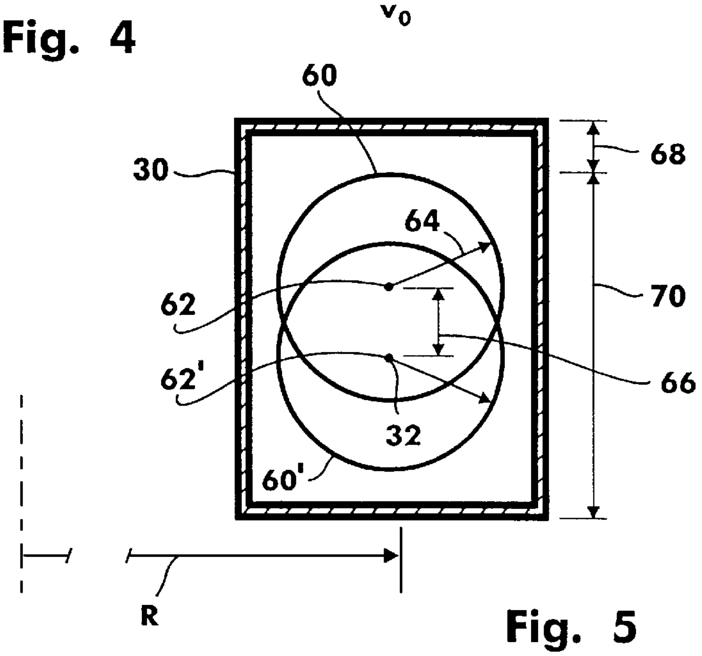
FIG. 5 is a cross sectional view of the chamber of the ion separator as seen along the line 5—5 in FIG. 1.

With specific reference to FIG. 5, consider that as the multi-species plasma 16 enters the chamber 28 it is described as having a generally circular cross section that is defined by a periphery 60, a center 62 and a radius 64. Further, consider that the radius 64 is equal to about 0.5 meters. As indicated above, by the time the plasma 16 has completely transited the chamber 28, the light ions 18 of mass $M_1$ will drift downward through a distance 66 that is equal to about 0.41 meters. Thus, at the exit end 34 of chamber 28, the remaining light ions 18 can be generally defined by a generally circular cross section that is defined by a periphery 60', a center 62' and a radius 64' wherein the radius 64' is still approximately equal to one half meter. The center 62, however, will have moved downwardly to the center 62' through the distance 66. Accordingly, in order to accommodate the multi-species plasma 16 in the chamber 28 by keeping the light mass ions 18 in the chamber 28 while allowing the heavy mass ions 20 to be collected before exiting the chamber 28, the distance 68 should be around 0.25 meters and the distance 70 should be around 1.66 meters.

For an alternate embodiment of the ion separator 10, the chamber 28 can be tilted or inclined so that the central axis 32 will assume a pitch angle α. For the specific case wherein $\alpha=u_{d1}/v_o=h_1/L_1$ it can happen that the path 38 of ion 18 will coincide with the central axis 32. The consequence of this is that, although the heavier mass ions 20 can still be directed to hit the wall 30 before they completely transit the chamber 28, the lighter mass ions 18 can be prevented from hitting the wall 30. For this configuration, the ions 18 can be collected at the end 34 of chamber 28 after they have passed through the chamber 28.

The collection of ions 18,20 from the wall 30 of chamber 28 can be accomplished in several ways. First, mechanical scrubbers (not shown) can be used to remove ions 18,20 from the wall 30. In most instances, however, the use of mechanical scrubbers will require that operation of the ion separator 10 be stopped during the cleaning operation. Second, fluid flushing can be employed to remove the ions 18, 20 as they collect on the wall 30. Finally, as shown in FIG. 1 and FIG. 3, a collector 42 can be positioned, beginning at the arc length distance $L_2$, (approximately 7.8 meters from end 26) to trap ions 20 at the point where they would have otherwise drifted into contact with the wall 30. As indicated above, the collector 42 will extend all the way to the end 34 of the chamber 28 and will, therefore, extend to a distance of approximately 39.4 meters from end 26.

Figure 6:
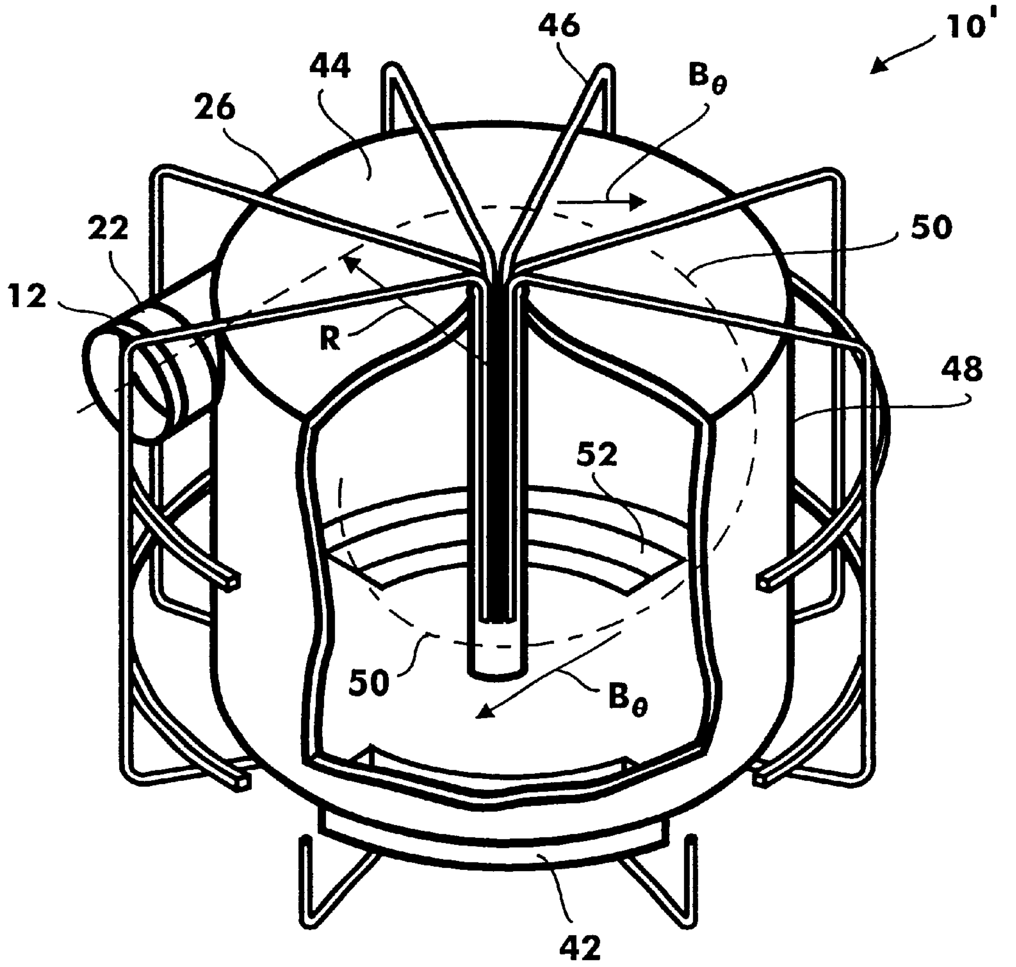
FIG. 6 is a perspective view of an alternate embodiment of an ion separator in accordance with the present invention, with portions broken away for clarity.

An alternate embodiment for the ion separator in accordance with the present invention is shown in FIG. 6 and is generally designated 10'. The apparent difference between the ion separator 10 and the ion separator 10' is that the latter has a cylindrical shaped chamber 44. This cylindrical configuration for the ion separator 10' necessitates a modification of the means for generating the magnetic field $B_\Theta$. Accordingly, an electromagnetic coil 46 is provided which includes a central column 48 which continues the coil 46 along the cylinder's longitudinal axis inside the chamber 44. The result is a magnetic field $B_\Theta$ which is directed along a path 50 which will be generally followed by the ions 18, 20 as they transit through the chamber 44 of ion separator 10'. In all essential respects, the magnetic field $B_\Theta$ that is generated in chamber 44, and the path 50 that is followed by ions 18, 20 in the ion separator 10' is identical with the magnetic field and the path followed by ions 18, 20 as disclosed above in conjunction with the ion separator 10. For the ion separator 10' a collector 42 is provided for the collection of the heavy mass ions 20 ($M_2$) and another collector 52 is provided further along the path 50 for the collection of light mass ions 18 ($M_1$). The location of the collectors 42 and 52 in the ion separator 10' are substantially as shown in FIG. 6.

While the particular Charged Particle Separator With Drift Compensation as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An ion separator which comprises:

a plasma source for generating a multi-species plasma, said multi-species plasma including a plurality of ions of a heavy mass ($M_2$), and a plurality of ions of light mass ($M_1$);

an accelerator in fluid communication with said plasma source for accelerating all of said ions in said multi-species plasma to a common velocity ($v_o$);

a hollow chamber having a wall and a first end for receiving said ions in said multi-species plasma at said common velocity from said accelerator;

a magnetic means mounted on said chamber to establish a curved path between said first end and a second end of said chamber for each said ion to generate a respective drift velocity ($u_d$) for each said ion as said ion travels along said path in said chamber, said drift velocity for each particular said ion being proportional to said mass of said particular ion to cause said ion of heavy mass ($M_2$) to drift through a distance ($h_2$) and said ion of light mass ($M_1$) to drift through a distance ($h_1$) at a predetermined arc length ($L_2$) from said first end, wherein $h_2>h_1$; and a means mounted on said chamber at said predetermined arc length ($L_2$) for collecting said separated ions of heavy mass ($M_2$) from said chamber.

2. An ion separator as recited in claim 1 wherein said chamber defines a central axis extending through said chamber from said first end to said second end, there being at least a distance (r) from said central axis to said wall wherein $r=h=u_dL/v_o$.

3. An ion separator as recited in claim 2 wherein said chamber is inclined to configure said central axis as a helix having a pitch angle $\alpha$.

4. An ion separator as recited in claim 3 wherein $\alpha$ is determined using a drift velocity $u_{d1}$ and said drift distance $h_1$ of said ions of mass $M_1$ so that $\alpha=u_{d1}/v_o=h_1/L_1$.

5. An ion separator as recited in claim 3 wherein ions of mass $M_1$ exit said chamber through said second end thereof.

6. An ion separator as recited in claim 3 wherein said magnetic means establishes a magnetic field oriented in said chamber with a direction substantially parallel to said central axis, said magnetic field having a field strength ($B_\Theta$), said central axis having a radius of curvature (R) and, where e is the elementary charge, said chamber having at least an arc $\Theta$ corresponding to L, wherein $\Theta=eB_\Theta h/(M_2-M_1)v_o$.

7. An ion separator as recited in claim 1 wherein said chamber is generally shaped as a toroid, said pitch angle $\alpha$ is equal to zero and said central axis is circular.

8. An ion separator which comprises:

a hollow chamber surrounded by a wall;

a magnetic means mounted on said wall and configured to establish a path for a multi-species plasma, said multi-species plasma including a plurality of ions of a heavy mass ($M_2$) and a plurality of ions of light mass ($M_1$), said path being oriented to generate a drift velocity ($u_d$) for each said ion as said ion travels along said path in said chamber, said drift velocity ($u_{d1}$,$u_{d2}$) for each particular said ion being proportional to said mass ($M_1$,$M_2$) of said particular ion to sequentially direct said ions through a drift distance (h) and into contact with said wall of said chamber beginning at respective predetermined distances ($L_1/L_2$) from an end of said chamber where said ions enter said chamber, and wherein said path has a length greater than said predetermined distance ($L_2$) for an ion of heavy mass ($M_2$); and means for removing said separated ions from said wall of said chamber at a respective said predetermined distance.

9. An ion separator as recited in claim 8 wherein said removing means is a mechanical scrubber.

10. An ion separator as recited in claim 8 wherein said removing means is a collector.

11. An ion separator as recited in claim 8 further comprising:

a plasma source for generating said multi-species plasma; and an accelerator in fluid communication with said plasma source for accelerating all of said ions in said multi-species plasma to a common velocity ($v_o$) before said ions enter said chamber through said end thereof.

12. An ion separator as recited in claim 11 wherein said end of said chamber is a first end and said chamber has a second end, wherein said path is curved between said first end and a second end of said chamber, and wherein said chamber has a wall and defines a central axis extending through said chamber from said first end to said second end, there being at least a distance (r) from said central axis to said wall wherein $r=h=u_dL/v_o$.

13. An ion separator as recited in claim 12 wherein said chamber is inclined to configure said central axis as a helix having a pitch angle $\alpha$.

14. An ion separator as recited in claim 13 wherein $\alpha$ is determined using a drift velocity $u_{d1}$ and drift distance $h_1$ of the ions of mass $M_1$ so that $\alpha=u_{d1}/v_o=h_1/L_1$.

15. An ion separator as recited in claim 13 wherein ions of mass $M_1$ exit said chamber through said second end thereof.

16. An ion separator as recited in claim 13 wherein said magnetic means establishes a magnetic field oriented in said chamber with a direction substantially parallel to said central axis, said magnetic field having a field strength ($B_\Theta$), said central axis having a radius of curvature (R) and, where e is the elementary charge, said chamber having at least an arc $\Theta$ corresponding to L, wherein $\Theta = eB_\theta h/(M_2 - M_1)v_o$.

17. An ion separator as recited in claim 13 wherein said chamber is generally shaped as a toroid, said pitch angle $\alpha$ is equal to zero and said central axis is circular.

18. A method for separating ions which comprises the steps of:

generating a multi-species plasma, said multi-species plasma including a plurality of ions of a heavy mass ($M_2$), and a plurality of ions of light mass ($M_1$);

accelerating all of said ions in said multi-species plasma to a common velocity ($v_o$);

using a magnetic field to establish a curved path through a hollow chamber between a first end and a second end of said chamber to generate a respective drift velocity ($u_d$) for each said ion as said ion travels along said path in said chamber, said drift velocity for each particular said ion being proportional to said mass of said particular ion to cause said ion of heavy mass $M_2$ to drift through a distance ($h_2$) and said ion of light mass ($M_1$) to drift through a distance ($h_1$) at a predetermined arc length ($L_2$) from said first end, wherein $h_2 > h_1$; and collecting said separated ions of heavy mass ($M_2$) from said chamber at said predetermined arc length ($L_2$) from said first end of said chamber.

19. A method as recited in claim 18 wherein said chamber has a wall and defines a central axis extending from said first end to said second end, there being at least a distance (h) from said central axis to said wall wherein $r = h = u_d L/v_o$, and wherein said chamber is inclined to configure said central axis as a helix having a pitch angle $\alpha$, where $\alpha$ is determined using a drift velocity $u_{d1}$ and drift distance $h_1$ of an ion of light mass $M_1$ so that $\alpha = u_{d1}/v_o = h_1/L_1$.

20. A method as recited in claim 18 wherein said magnetic field is oriented in said chamber with a direction substantially parallel to said central axis, said magnetic field having a field strength ($B_\theta$), said central axis having a radius of curvature (R) and, where e is the elementary charge, said chamber having at least an arc $\Theta$ corresponding to L wherein $\Theta = eB_\theta h/(M_2 - M_1)v_o$.

21. A method as recited in claim 18 wherein ions of mass $M_1$ exit said chamber through said second end thereof.

* * * * *